(12) United States Patent
Zhang

(10) Patent No.: US 11,825,134 B2
(45) Date of Patent: Nov. 21, 2023

(54) METHOD FOR INTERACTING IN LIVE-STREAMING AND SERVER

(71) Applicant: BEIJING DAJIA INTERNET INFORMATION TECHNOLOGY CO., LTD., Beijing (CN)

(72) Inventor: Yang Zhang, Beijing (CN)

(73) Assignee: BEIJING DAJIA INTERNET INFORMATION TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 17/709,124

(22) Filed: Mar. 30, 2022

(65) Prior Publication Data
US 2022/0224950 A1    Jul. 14, 2022

Related U.S. Application Data

(63) Continuation of application No. PCT/CN2021/073417, filed on Jan. 22, 2021.

(30) Foreign Application Priority Data

Jan. 22, 2020  (CN) .......................... 202010075760.4

(51) Int. Cl.
H04N 21/488   (2011.01)
H04N 21/2187  (2011.01)
(Continued)

(52) U.S. Cl.
CPC ..... H04N 21/2187 (2013.01); H04N 21/4312 (2013.01); H04N 21/4788 (2013.01)

(58) Field of Classification Search
CPC ........... H04N 21/2187; H04N 21/4312; H04N 21/4788
(Continued)

(56) References Cited

U.S. PATENT DOCUMENTS

2003/0046702 A1* 3/2003 Sasaki ............... H04N 21/6587
                                                             348/E7.071
2008/0301745 A1* 12/2008 Liu .................. H04N 21/23106
                                                             725/110
(Continued)

FOREIGN PATENT DOCUMENTS

CN    100385945 C  *  4/2008  ......... H04N 21/4786
CN    106028166 A     10/2016
(Continued)

OTHER PUBLICATIONS

International Search Report and Written Opinion of the International Searching Authority from the China National Intellectual Property Administration, in PCT/CN2021/073417 dated Apr. 26, 2021, which is an international application corresponding to this U.S. application.
(Continued)

*Primary Examiner* — Ruolei Zong
(74) *Attorney, Agent, or Firm* — Kolitch Romano Dascenzo Gates LLC

(57) ABSTRACT

A method for interacting in live-streaming is provided. The method includes: adding a first terminal requesting to join a first live-streaming room to a second live-streaming room in response to that a current moment is within a target time range, the first live-streaming room being a live-streaming room which relays live-streaming data from a plurality of live-streaming rooms; acquiring first live-streaming room information of the first live-streaming room, and sending a modification request to the first terminal, this modification request being configured to request the first terminal to modify second live-streaming room information of the second live-streaming room to be the first live-streaming room information; and broadcasting an interaction message to the second live-streaming room in response to receiving an
(Continued)

interaction request of the first terminal, wherein the interaction request carries the interaction message.

20 Claims, 9 Drawing Sheets

(51) Int. Cl.
    *H04N 21/2668* (2011.01)
    *H04N 21/475* (2011.01)
    *H04N 21/431* (2011.01)
    *H04N 21/4788* (2011.01)

(58) Field of Classification Search
    USPC .......................................................... 709/231
    See application file for complete search history.

(56) References Cited

U.S. PATENT DOCUMENTS

| | | | |
|---|---|---|---|
| 2016/0150284 A1 | 5/2016 | Sokolov et al. | |
| 2017/0279759 A1* | 9/2017 | Liden | H04L 65/1069 |
| 2019/0053302 A1* | 2/2019 | Bang | H04W 76/23 |

FOREIGN PATENT DOCUMENTS

| | | | | |
|---|---|---|---|---|
| CN | 106534953 A | | 3/2017 | |
| CN | 107172443 A | | 9/2017 | |
| CN | 108521576 A | * | 9/2018 | ......... H04N 21/2187 |
| CN | 109089169 A | | 12/2018 | |
| CN | 109120965 A | | 1/2019 | |
| CN | 109445577 A | * | 3/2019 | ........... A63F 13/795 |
| CN | 110139116 A | | 8/2019 | |
| CN | 110248202 A | | 9/2019 | |
| CN | 111294607 A | | 6/2020 | |
| WO | WO-2019079103 A1 | * | 4/2019 | |
| WO | 2019134285 A1 | | 7/2019 | |

OTHER PUBLICATIONS

The State Intellectual Property Office of People's Republic of China, First Office Action in Application No. 202010075760.4, dated Mar. 29, 2021, which is a foreign counterpart application corresponding to this U.S. Patent Application, to which this application claims priority.

The State Intellectual Property Office of People's Republic of China, Second Office Action in Application No. 202010075760.4, dated Jun. 28, 2021, which is a foreign counterpart application corresponding to this U.S. Patent Application, to which this application claims priority.

The State Intellectual Property Office of People's Republic of China, Notification of Completion of Formalities for Patent Register and Notification to Grant Patent right for Invention in Application No. 202010075760.4, dated Sep. 3, 2021, which is a foreign counterpart application corresponding to this U.S. Patent Appication, to which this application claims priority.

* cited by examiner

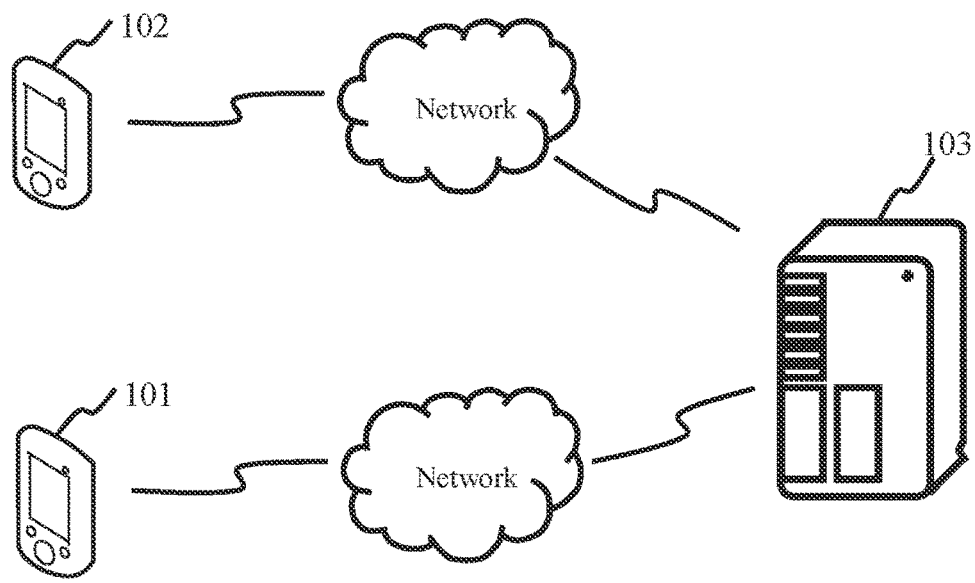

FIG. 1

Adding a first terminal requesting to join a first live-streaming room to a second live-streaming room in response to that a current moment is within a target time range, the first live-streaming room being a live-streaming room which relays live-streaming data from a plurality of live-streaming rooms, the target time range being a time range for the first live-streaming room to relay second live-streaming data of the second live-streaming room which is one of the live-streaming rooms, and the first terminal being a terminal used by an audience account — S201

Acquiring first live-streaming room information of the first live-streaming room, and sending a modification request to the first terminal, modification request carrying the first live-streaming room information and being configured to request the first terminal to modify second live-streaming room information of the second live-streaming room to be the first live-streaming room information — S202

Broadcasting an interaction message to the second live-streaming room in response to receiving an interaction request of the first terminal, wherein the interaction request carries the interaction message — S203

FIG. 2

METHOD FOR INTERACTING IN LIVE-STREAMING AND SERVER

CROSS-REFERENCE TO RELATED APPLICATION

This application is a continuation application of International Application No. PCT/CN2021/073417, filed on Jan. 22, 2021, which claims the priority of Chinese Application No. 202010075760.4, filed on Jan. 22, 2020, both of which are incorporated by reference herein.

TECHNICAL FIELD

The present disclosure relates to the field of Internet technologies, and more particularly, to a method for interacting in live-streaming and a server.

BACKGROUND

With the rapid development of live-streaming services, the services are no longer limited to audiences in one live-streaming room watching the content of only this live-streaming room. For example, there is situation that audiences in one live-streaming room want to watch the content of a plurality of live-streaming rooms. In this situation, the audience will sequentially display the content of the plurality of live-streaming rooms in a chronological order by means of relaying live-streaming data to create brand-new content of the live-streaming room. In one example, in a period from 9 am to 12 pm (i.e., three hour period), audiences in a live-streaming room A watch the content of live-streaming rooms B, C, and D. In addition, live-streaming data of the live-streaming room B is relayed to the live-streaming room A at 9 am to 10 am; live-streaming data of the live-streaming room C is relayed to the live-streaming room A at 10 am to 11 am; and live-streaming data of the live-streaming room D is relayed to the live-streaming room A at 11 am to 12 pm.

SUMMARY

Embodiments of the present disclosure provide a method for interacting in live-streaming and a server. The technical solutions of the present disclosure are as follows.

According to an aspect of embodiments of the present disclosure, a method for interacting in live-streaming is provided. The method includes:
adding a first terminal requesting to join a first live-streaming room to a second live-streaming room in response to that a current moment is within a target time range, the first live-streaming room being a live-streaming room which relays live-streaming data from a plurality of live-streaming rooms, the target time range being a time range for the first live-streaming room to relay second live-streaming data of the second live-streaming room which is one of the live-streaming rooms, and the first terminal being a terminal used by an audience account;
acquiring first live-streaming room information of the first live-streaming room, and sending a modification request to the first terminal, the modification request carrying the first live-streaming room information and being configured to request the first terminal to modify second live-streaming room information of the second live-streaming room to be the first live-streaming room information; and
broadcasting an interaction message to the second live-streaming room in response to receiving an interaction request of the first terminal, wherein the interaction request carries the interaction message.

According to another aspect of embodiments of the present disclosure, a method for interacting in live-streaming is provided. The method includes:
receiving a modification request sent by the server, the modification request carrying first live-streaming room information of the first live-streaming room, and the first live-streaming room being a live-streaming room configured to relay live-streaming data from a plurality of live-streaming rooms;
virtualizing a currently joined second live-streaming room as the first live-streaming room based on the modification request, by modifying second live-streaming room information of the second live-streaming room to be the first live-streaming room information; and
sending an interaction request to the server in response to receiving an input interaction message, the interaction request carrying the interaction message and being configured to request the server to broadcast the interaction message to the second live-streaming room.

According to another aspect of embodiments of the present disclosure, a server is provided. The server includes a processor; and a memory configured to store an instruction executable by the processor, wherein the processor is configured to execute the instruction to implement:
adding a first terminal requesting to join a first live-streaming room to a second live-streaming room in response to that a current moment is within a target time range, the first live-streaming room being a live-streaming room which relays live-streaming data from a plurality of live-streaming rooms, the target time range being a time range for the first live-streaming room to relay second live-streaming data of the second live-streaming room which is one of the live-streaming rooms, and the first terminal being a terminal used by an audience account;
acquiring first live-streaming room information of the first live-streaming room, and sending a modification request to the first terminal, the modification request carrying the first live-streaming room information and being configured to request the first terminal to modify second live-streaming room information of the second live-streaming room to be the first live-streaming room information; and
in response to receiving an interaction request, which carries an interaction message, of the first terminal, broadcasting the interaction message to the second live-streaming room.

According to another aspect of embodiments of the present disclosure, a terminal is provided. The terminal includes a processor; and a memory configured to store an instruction executable by the processor, wherein the processor is configured to execute the instruction to implement the methods for interacting in live-streaming in the above aspects.

According to another aspect of embodiments of the present disclosure, a non-transitory storage medium is provided, wherein an instruction in the non-transitory storage medium, when being executed by a processor of a server, enables the server to perform the methods for interacting in live-streaming in the above aspects.

According to another aspect of embodiments of the present disclosure, a non-transitory storage medium is provided, wherein an instruction in the non-transitory storage medium, when being executed by a processor of a terminal, enables the terminal to perform the methods for interacting in live-streaming in the above aspects.

It should be understood that the above general description and the following detailed description are only illustrative, and not intended to limit the present disclosure.

BRIEF DESCRIPTION OF THE DRAWINGS

The drawings herein are incorporated into the description and constitute a part of the description, show embodiments that are consistent with the present disclosure, and are used together with the description to explain the principles of the present disclosure, rather than constituting an improper limitation to the present disclosure.

FIG. 1 is a schematic diagram of an implementation environment according to an embodiment;

FIG. 2 is a flowchart of a method for interacting in live-streaming according to an embodiment;

DETAILED DESCRIPTION

Figure 3:
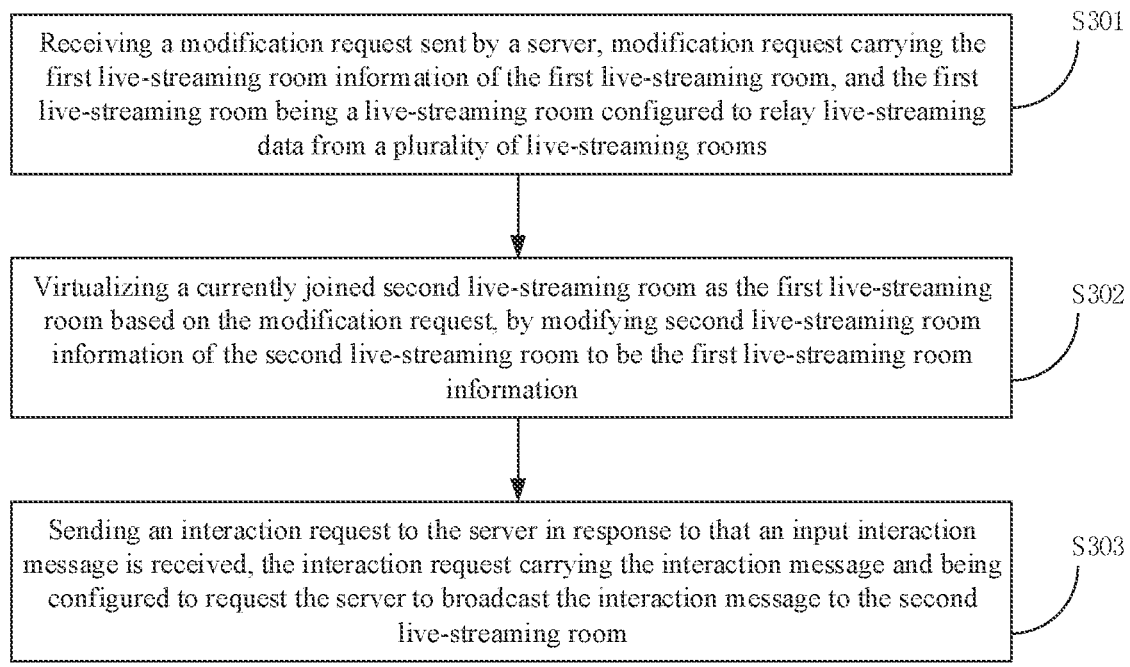
FIG. 3 is a flowchart of a method for interacting in live-streaming according to an embodiment.

In order to make a person of ordinary skill in the art better understand the technical solutions of the present disclosure, the technical solutions in the embodiments of the present disclosure are clearly and completely described in the following with reference to the accompanying drawings.

It should be noted that the terms "first", "second" and the like in the description and claims, as well as the above-mentioned drawings, of the present disclosure are used to distinguish similar objects, but not necessarily used to describe a specific order or precedence order. It should be understood that data used in this way may be interchanged where appropriate so that the embodiments of the present disclosure described herein can be implemented in a sequence other than those illustrated or described herein. The implementations described in the following embodiments are not all the embodiments of the present disclosure. On the contrary, these embodiments are simply examples of apparatuses and methods consistent with some aspects of the present disclosure, as detailed in the appended claims.

The user information involved in the present disclosure is information authorized by the user or fully authorized by all parties.

FIG. 1 is a schematic diagram of an implementation environment according to an embodiment. Referring to FIG. 1, the implementation environment includes a first terminal 101, a second terminal 102, and a server 103. The first terminal 101 is a terminal used by an audience account, and the second terminal 102 is a terminal used by an anchor account.

The first terminal 101 and the server 103 are connected through a wireless or wired network; and the second terminal 102 and the server 102 are connected through a wireless or wired network. In addition, the first terminal 101 and the second terminal 102 are each equipped with a client serviced by the server 103. The audience account of the first terminal 101 implements functions such as data transmission and message interaction with the server 103 through the client. The anchor account of the second terminal 102 implements functions such as data transmission and message interaction with the server 103 through the client. The audience account of the first terminal 101 interacts with the anchor account of the second terminal 102 through the clients.

The client may be any client that is capable of performing live-streaming In some embodiments, the client may be a live-streaming client or a short video client. The first terminal 101 and the second terminal 102 are mobile phones, tablet computers or other electronic devices. The server 103 may be a server or a server cluster consisting of a plurality of servers, or a cloud computing center.

FIG. 2 is a flowchart of a method for interacting in live-streaming according to an embodiment. Referring to FIG. 2, the method for interacting in live-streaming, executed by a server, includes the following steps S201 to S203.

In S201, a first terminal requesting to join a first live-streaming room is added to a second live-streaming room in response to that a current moment is within a target time range, the first live-streaming room being a live-streaming room which relays live-streaming data from a plurality of live-streaming rooms, the target time range being a time range for the first live-streaming room to relay second live-streaming data of the second live-streaming room which is one of the live-streaming rooms, and the first terminal being a terminal used by an audience account.

In S202, first live-streaming room information of the first live-streaming room is acquired, and a modification request is sent to the first terminal, the modification request carrying the first live-streaming room information and being configured to request the first terminal to modify second live-streaming room information of the second live-streaming room to be the first live-streaming room information.

In S203, an interaction message is broadcast to the second live-streaming room in response to that an interaction request of the first terminal is received, wherein the interaction request carries the interaction message.

In some embodiments, adding the first terminal requesting to join the first live-streaming room to the second live-streaming room in response to that the current moment is within the target time range includes:

receiving a joining request sent by the first terminal, the joining request carrying a first live-streaming room identifier of the first live-streaming room;

determining, based on the first live-streaming room identifier, a time range of each live-streaming room for the first live-streaming room to relay live-streaming data; and adding the first terminal to the second live-streaming room in response to determining that the current moment is within the target time range for the first live-streaming room to relay the second live-streaming data of the second live-streaming room based on the time range of each live-streaming room.

In some embodiments, adding the first terminal requesting to join the first live-streaming room to the second live-streaming room in response to that the current moment is within the target time range includes:

moving the first terminal from a third live-streaming room to the second live-streaming room, in response to that the current moment reaches a start time from which the first live-streaming room relays the second live-streaming data of the second live-streaming room, wherein the third live-streaming room is a live-streaming room of which live-streaming data is relayed by the first live-streaming room before the first live-streaming room relays the second live-streaming data.

In some embodiments, moving the first terminal to the second live-streaming room from the third live-streaming room includes:

selecting a second live-streaming room identifier of the second live-streaming room to be moved to from a live-streaming room list of the first live-streaming room based on a third live-streaming room identifier of the third live-streaming room, wherein the live-streaming room list includes a sequence of each of live-streaming room identifiers of the live-streaming rooms;

determining a terminal identifier of the first terminal based on the third live-streaming room identifier; and moving the first terminal to the second live-streaming room from the third live-streaming room based on the second live-streaming room identifier and the terminal identifier of the first terminal.

In some embodiments, the method for interacting in live-streaming further includes:

sending a buffer animation to the first terminal in the process of moving the first terminal to the second live-streaming room from the third live-streaming room.

In some embodiments, the method for interacting in live-streaming further includes:

sending the third live-streaming data of the third live-streaming room and the second live-streaming data of the second live-streaming room to the first terminal within a first preset duration prior to moving the first terminal to the second live-streaming room from the third live-streaming room; and performing the step of moving the first terminal to the second live-streaming room from the third live-streaming room in response to that a quality parameter of the second live-streaming data of the second live-streaming room received by the first terminal exceeds a preset threshold.

In some embodiments, the method for interacting in live-streaming further includes:

receiving the second live-streaming data of the second live-streaming room; and performing the step of moving the first terminal to the second live-streaming room from the third live-streaming room in response to that the second live-streaming data indicates that an anchor account of the second live-streaming room has started live-streaming.

In some embodiments, adding the first terminal requesting to join the first live-streaming room to the second live-streaming room includes:

acquiring the second live-streaming room identifier of the second live-streaming room;

determining the second live-streaming room based on the second live-streaming room identifier; and adding the first terminal to the second live-streaming room based on the audience account.

In the embodiments of the present disclosure, since the second live-streaming room information of the second live-steaming room is modified to be the first live-streaming room information, the second live-streaming room is virtualized as the first live-streaming room, such that the audience account thinks he/she has entered the first live-streaming room. In addition, since there is an anchor account in the second live-streaming room, the user can directly interact with the anchor account in the second live-streaming room that uses the second terminal.

In addition, the first live-streaming room is equivalent to a virtual live-streaming room, and is created by the server. The audience account is actually constantly entering different live-streaming rooms. After the user enters different live-streaming rooms, live-streaming room information of the live-streaming rooms is always the first live-streaming room information. Therefore, for the user, this live-streaming room information has not changed, and the user seems to be in the first live-streaming room all the time. In addition, the process of the first terminal joining the first live-streaming room is actually a process in which the server moves the first terminal to the second live-streaming room and performs data moving.

FIG. 3 is a flowchart of another method for interacting in live-streaming according to an embodiment. Referring to FIG. 3, the method for interacting in live-streaming, executed by a first terminal, includes the following steps S301 to S303.

In S301, a modification request sent by a server is received, the modification request carrying the first live-streaming room information of the first live-streaming room, and the first live-streaming room being a live-streaming room configured to relay live-streaming data from a plurality of live-streaming rooms.

In S302, a currently joined second live-streaming room is virtualized as the first live-streaming room based on the modification request, by modifying second live-streaming room information of the second live-streaming room to be the first live-streaming room information.

In S303, an interaction request is sent to the server in response to receiving an input interaction message, the interaction request carrying the interaction message and being configured to request the server to broadcast the interaction message to the second live-streaming room.

In some embodiments, the method for interacting in live-streaming further includes:

displaying a main live-streaming interface, the main live-streaming interface including a first live-streaming room identifier of the first live-streaming room; and sending a joining request to the server in response to that the first live-streaming room identifier is triggered, the joining request carrying the first live-streaming room identifier, and the server being configured to determine, based on the first live-streaming room identifier, that the first live-streaming room relays the second live-streaming data of the second live-streaming room at the current moment, add the current first terminal to the second live-streaming room, and send the modification request to the first terminal.

In some embodiments, the method for interacting in live-streaming further includes:

playing the third live-streaming data of the third live-streaming room forwarded by the server; and switching the playing of the third live-streaming data to the playing of the second live-streaming data in response to receiving the second live-streaming data of the second live-streaming room forwarded by the server, the second live-streaming data being returned by the server after determining that the current moment reaches the time at which the first live-streaming room relays the live-streaming data of the second live-streaming room, and the third live-streaming room is a live-streaming room of which live-streaming data is relayed by the first live-streaming room before the first live-streaming room relays the second live-streaming data.

In some embodiments, the method for interacting in live-streaming further includes:
receiving a buffer animation sent by the server, and playing the buffer animation.

In some embodiments, switching the playing of the third live-streaming data to the playing of the second live-streaming data in response to receiving the second live-streaming data of the second live-streaming room forwarded by the server includes:
receiving the second live-streaming data and the third live-streaming data forwarded by the server;
continuously playing the third live-streaming data; and
switching the playing of the third live-streaming data to the playing of the second live-streaming data in response to that a quality parameter of the second live-streaming data exceeds a preset threshold.

In the embodiments of the present disclosure, since the second live-streaming room information of the second live-steaming room is modified to be the first live-streaming room information, the second live-streaming room is virtualized as the first live-streaming room, such that the audience account thinks he/she has entered the first live-streaming room. In addition, since there is an anchor account in the second live-streaming room, the user can directly interact with the anchor account in the second live-streaming room that uses the second terminal, which increases the motivation of the user for interaction.

First, the inventive concept of the present disclosure will be briefly introduced here. A directing and live-streaming method in the related art is to display the contents of a plurality of live-streaming rooms in a chronological order to form the content of a brand-new live-streaming room. In some embodiments, live-streaming data of a live-streaming room B is relayed to a live-streaming room A at 9 am to 10 am; live-streaming data of a live-streaming room C is relayed to the live-streaming room A at 10 am to 11 am; and live-streaming data of a live-streaming room D is relayed to the live-streaming room A at 11 am to 12 pm. The interaction of audience accounts in the live-streaming room can only be received by an anchor account in the current live-streaming room, without crossing the live-streaming rooms. Because the content of the live-streaming room A is content relayed by the live-streaming rooms B, C, and D and there is no anchor account in the live-streaming room A, audience accounts in the live-streaming room A cannot interact with each other.

In the embodiments of the present disclosure, the audience account entering one live-streaming room can watch the content of a plurality of live-streaming rooms, without using a method of relaying live-streaming data of the related technology. But instead, the audience account directly enters the live-streaming rooms B, C, and D, and makes certain modifications to the display on an audience side of the live-streaming room, such that the audience account thinks he/she has entered the live-streaming room A. In some embodiments, the live-streaming data of the live-streaming room B should be relayed to the live-streaming room A at 9 am to 10 am. At this time, the audience account is added to the live-streaming room B, and live-streaming room information of the live-streaming room B is modified to be live-streaming room information of the live-streaming room A. In this way, the user thinks he/she has entered the live-streaming room A, and can also interact with the anchor at this time. The live-streaming data of the live-streaming room C should be relayed to the live-streaming room A at 10 am to 11 am. At this time, the audience account is added to the live-streaming room C, and live-streaming room information of the live-streaming room C is modified to be the live-streaming room information of the live-streaming room A. In this way, the user thinks he/she has entered the live-streaming room A, and can also interact with the anchor at this time. Similarly, live-streaming data of the live-streaming room D should be relayed to the live-streaming room A at 11 am to 12 pm. At this time, the audience account is added to the live-streaming room D, and live-streaming room information of the live-streaming room D is modified to be the live-streaming room information of the live-streaming room A. In this way, the user thinks he/she has entered the live-streaming room A, and can also interact with the anchor at this time.

Figure 4:
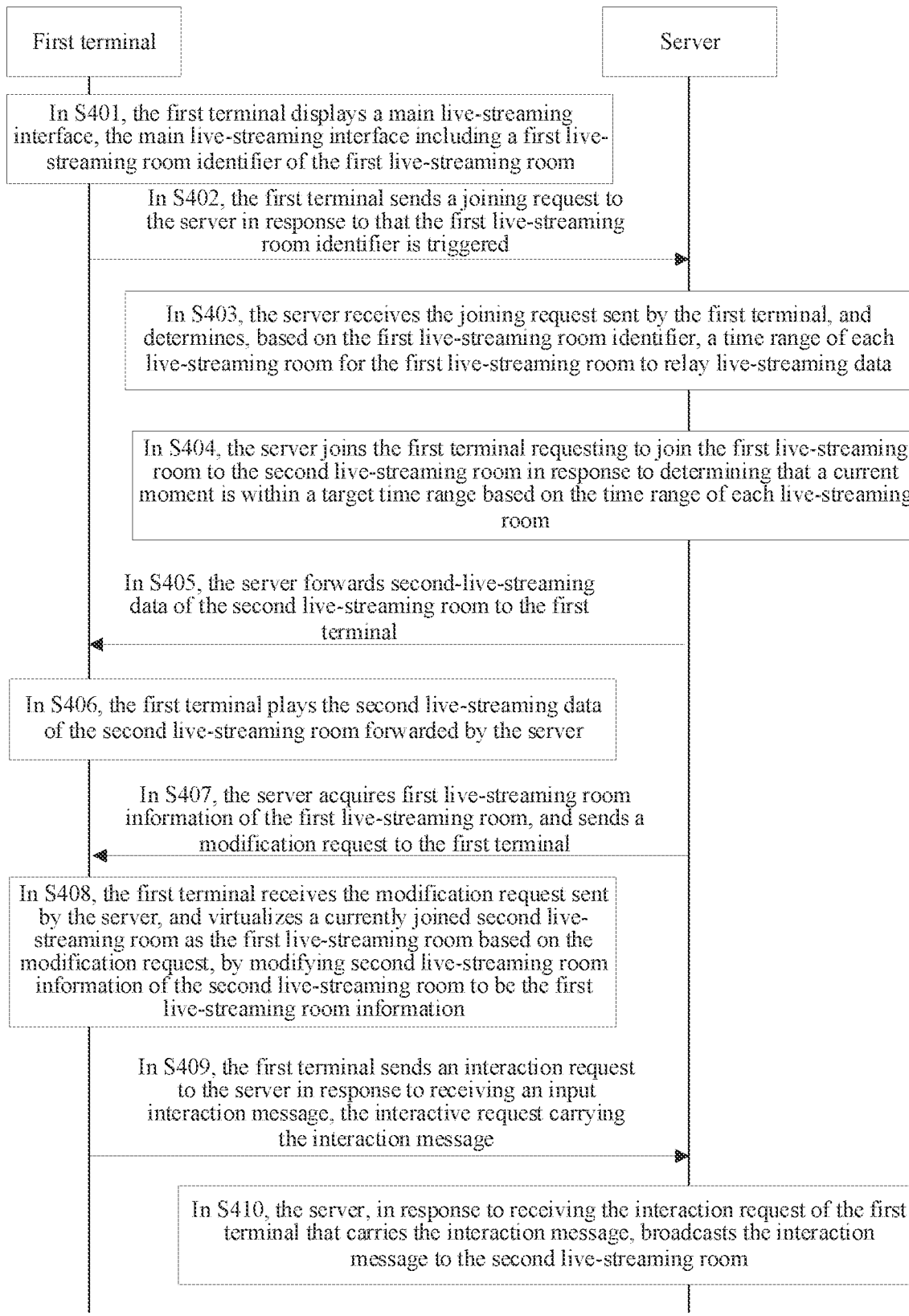
FIG. 4 is an interaction flowchart of a method for interacting in live-streaming according to an embodiment.

FIG. 4 is a flowchart of another method for interacting in live-streaming according to an embodiment. In the embodiments of the present disclosure, the process of an audience account requesting to join the live-streaming room is taken as an example for illustration. Referring to FIG. 4, the method for interacting in live-streaming includes the following steps S401 to S410.

In S401, the first terminal displays a main live-streaming interface, the main live-streaming interface including a first live-streaming room identifier of the first live-streaming room.

In S402, the first terminal sends a joining request to the server in response to that the first live-streaming room identifier is triggered, the joining request carrying the first live-streaming room identifier.

In S403, the server receives the joining request sent by the first terminal, and determines, based on the first live-streaming room identifier, a time range of each live-streaming room for the first live-streaming room to relay live-streaming data.

In S404, the server adds the first terminal requesting to join the first live-streaming room to the second live-streaming room in response to determining that a current moment is within a target time range based on the time range of each live-streaming room.

In S405, the server forwards second live-streaming data of the second live-streaming room to the first terminal.

In S406, the first terminal plays the second live-streaming data of the second live-streaming room forwarded by the server.

In S407, the server acquires first live-streaming room information of the first live-streaming room, and sends a modification request to the first terminal, the modification request carrying the first live-streaming room information and being configured to request the first terminal to modify second live-streaming room information of the second live-streaming room to be the first live-streaming room information.

In S408, the first terminal receives the modification request sent by the server, and virtualizes the second live-streaming room as the first live-streaming room based on the modification request, by modifying second live-streaming room information of the currently joined second live-streaming room to be the first live-streaming room information.

In S409, the first terminal sends an interaction request to the server in response to receiving an input interaction message, the interactive request carrying the interaction message.

In S410, the server, in response to receiving the interaction request of the first terminal that carries the interaction message, broadcasts the interaction message to the second live-streaming room.

About S401, the first live-streaming room is a live-streaming room that relays live-streaming data of a plurality of live-streaming rooms; and the main live-streaming interface includes at least the first live-streaming room identifier of the first live-streaming room. In some embodiments, the main live-streaming interface also includes one or more of a live-streaming time duration of the first live-streaming room, a brief introduction to live-streaming content, a target time range of each live-streaming room relayed by the first live-streaming room, and anchor information of each relayed live-streaming room.

Figure 5:
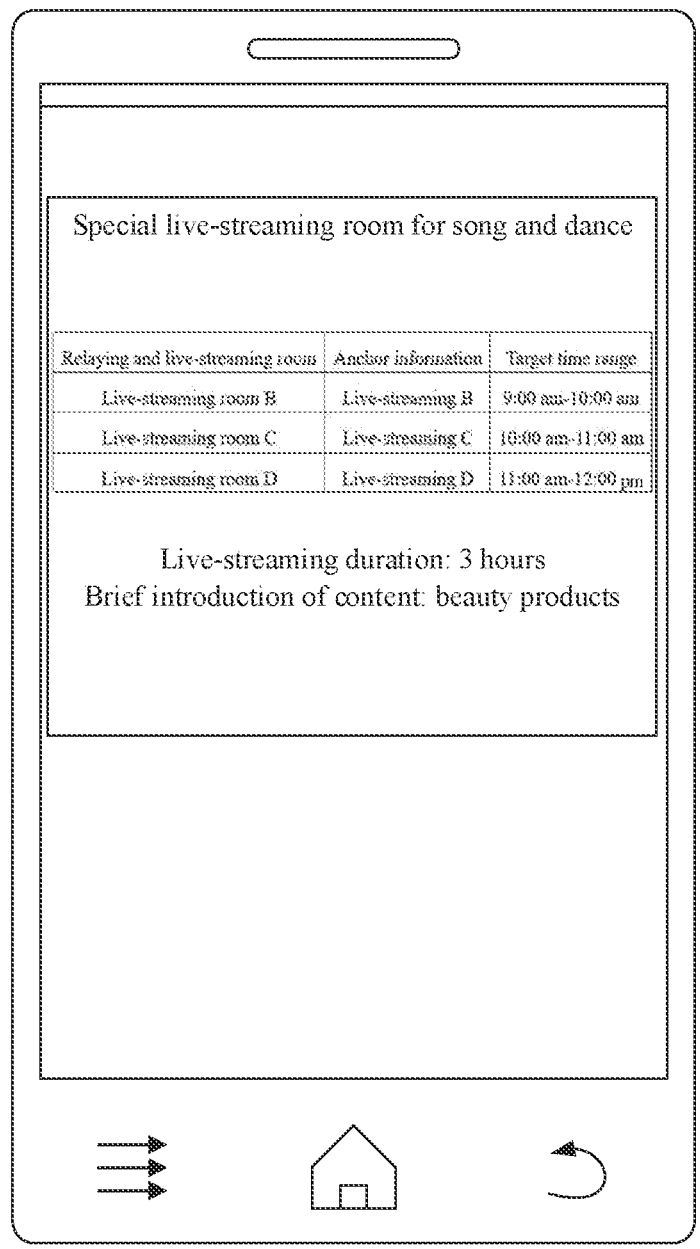
FIG. 5 is a schematic diagram of a main live-streaming interface according to an exemplary embodiment.

In some embodiments, referring to FIG. 5, the first live-streaming room is a live-streaming room A (a special live-streaming room for song and dance). In addition, the live-streaming room A relays live-streaming data of a live-streaming room B at 9 am to 10 am; broadcasts live-streaming data of a live-streaming room C at 10 am to 11 am; and broadcasts live-streaming data of a live-streaming room D at 11 am to 12 pm. The main live-streaming interface at least includes an identifier of the live-streaming room A.

In some embodiments, continuously referring to FIG. 5, the main live-streaming interface also includes one or more of the followings: a live-streaming duration of the first live-streaming room: 3 hours; a brief introduction of live-streaming content: beauty products; a target time range of each live-streaming room: a target time range of the live-streaming room B is from 9 am to 10 am, a target time range of the live-streaming room C from 10 am to 11 am and a target time range of the live-streaming room D from 11 am to 12 pm; and anchor information: user information of an anchor B, user information of an anchor C, and user information of an anchor D.

In the embodiments of the present disclosure, the main live-streaming interface can display not only a first live-streaming room identifier, but also one or more of a live-streaming time duration of the first live-streaming room, a brief introduction to live-streaming content, a target time range of each live-streaming room relayed by the first live-streaming room, and anchor information of each relayed live-streaming room. Therefore, the audience account can select a suitable time period to watch the live-streaming in the first live-streaming room by using this live-streaming information.

In some embodiments, the first terminal can display the main live-streaming interface through a live-streaming application. The first terminal displaying the main live-streaming interface includes: initiating the live-streaming application by the first terminal in response to that a live-streaming application icon is triggered; and displaying the main live-streaming interface in a display interface of the live-streaming application. The main live-streaming interface includes the first live-streaming room identifier of the first live-streaming room.

About S402, in some embodiments, the audience account can enter the first live-streaming room to watch the live-streaming by triggering the first live-streaming room identifier. Correspondingly, this step includes: clicking the first live-streaming room identifier by a user; and sending the joining request to the server by the first terminal in response to that the first live-streaming room identifier is triggered, the joining request carrying at least the first live-streaming room identifier.

In some embodiments, the joining request also carries one or more of an audience account, a user level, and user authority information of the first terminal.

In some embodiments, the first terminal sends the joining request to the server in response to that the first live-streaming room identifier is triggered. In embodiments of the present disclosure, the first terminal sends the joining request directly to the server in response to that the first live-streaming room identifier is triggered. In this way, the delay is reduced and the responsiveness is improved.

In some other embodiments, the first terminal first determines whether the first terminal meets a target condition for watching live-streaming in response to that the first live-streaming room identifier is triggered, without sending the joining request directly to the server; the first terminal sends this joining request to the server in response to that the first terminal satisfies the target condition for watching the live-streaming; and the first terminal does not send the joining request to the server in response to that the first terminal dose not satisfy the target condition for watching the live-streaming.

In some embodiments, the target condition is as follows: a network environment is a wireless-fidelity (WiFi) environment, or a package of a mobile network is an unlimited package, etc.

In the embodiments of the present disclosure, the first terminal sends the joining request to the server in the case of satisfying the target condition for watching the live-streaming, which can ensure that the user's property is not lost.

In some embodiments, the first terminal first displays a prompt message in response to that the first terminal dose not satisfy the target condition for watching the live-streaming; and sends the joining request to the server in response to receiving an acknowledgment operation for the prompt message.

About S403, the server stores a live-streaming room list of the first live-streaming room, the live-streaming room list including time ranges of a plurality of live-streaming rooms for the first live-streaming room to relay live-streaming data.

Correspondingly, the server determines the time ranges of the plurality of live-streaming rooms from the live-streaming room list. A time range of any live-streaming room is a time range for the first live-streaming room to relay live-streaming data of the live-streaming room.

In some embodiments, the live-streaming room list of the live-streaming room A is shown in Table 1 below:

TABLE 1

| Live-streaming room B | 9:00 am-10:00 am |
| Live-streaming room C | 10:00 am-11:00 am |
| Live-streaming room D | 11:00 am-12:00 pm |

In some embodiments, the joining request is sent before the first live-streaming room starts live-streaming Or, the joining request is sent after the first live-streaming room starts live-streaming In some embodiments, the server determines the time ranges of the plurality of live-streaming rooms based on the first live-streaming room identifier in response to that the joining request is sent before the first live-streaming room starts live-streaming.

The server determines the time ranges of a plurality of live-streaming rooms that is being in live-streaming and that is not in live-streaming among the plurality of live-streaming rooms in response to that the joining request is sent before the first live-streaming room starts live-streaming.

In some embodiments, the live-streaming room list of live-streaming rooms relayed by the live-streaming room A is shown in Table 1. The joining request is sent at 10:30 am. The server determines the time range of the live-streaming room C that is being in live-streaming and the time range of the live-streaming room D that is not in live-streamlining in response to that the joining request is sent after the first live-streaming room starts live-streaming.

In the embodiments of the present disclosure, the server only determines the time ranges of a plurality of live-streaming rooms that is being in live-streaming and that is not in live-streamlining among the plurality of live-streaming rooms in response to that the joining request is sent after the first live-streaming room starts live-streaming, which can prevent acquiring invalid information.

About S404, in some embodiments, the time ranges of a plurality of live-streaming rooms correspond to different time sequences, and the first live-streaming room relays the plurality of live-streaming rooms in a chronological order. The second live-streaming room is a live-streaming room that is being relayed by the first live-streaming room at the current moment. The target time range is a time range for the first live-streaming room to relay second live-streaming data of the second live-streaming room.

In some embodiments, the time range of the live-streaming room B is from 9 am to 10 am; the time range of the live-streaming room C is from 10 am to 11 am; and the time range of the live-streaming room D is from 11 am to 12 pm. In the case that the current moment is 10:30 am, the server determines that 10:30 am is within the time range of the live-streaming room C based on the time range of the live-streaming room B, the time range of the live-streaming room C, and the time range of the live-streaming room D, and then add the first terminal to the live-streaming room C.

In some embodiments, adding the first terminal requesting to join the first live-streaming room to the second live-streaming room by the server includes: acquiring an audience account of the user and a second live-streaming room identifier of the second live-streaming room by the server; determining the second live-streaming room based on the second live-streaming room identifier; and adding the first terminal to the second live-streaming room based on the audience account.

In some embodiments, the server stores a corresponding relationship between the audience account and the first terminal. Correspondingly, adding the first terminal to the second live-streaming room by the server based on the audience account includes: acquiring the audience account of the user by the server; determining the first terminal corresponding to the audience account from the stored corresponding relationship between the audience account and the first terminal; and adding the first terminal to the second live-streaming room.

About S405, the second terminal acquires second live-streaming data of an anchor account in the second live-streaming room, and sends the second live-streaming data to the server; and the server receives the second live-streaming data, and forwards the second live-streaming data to the first terminal.

In some embodiments, a second terminal used by an anchor account of the live-streaming room C acquires second live-streaming data of an anchor account in the live-streaming room C; and the server receives the second live-streaming data.

In some embodiments, the server forwards the second live-streaming data directly to the first terminal after receiving the second live-streaming data. In some embodiments, after receiving the second live-streaming data, the server processes, based on a user level of an audience account of the first terminal, the second live-streaming data into a data format matching this user level, and forwards the processed second live-steaming data to the first terminal.

In some embodiments, in the case that the user level is very important person (VIP), the server processes the second live-streaming data into high-resolution live-streaming data; and in the case that the user level is normal, the server processes the second live-streaming data as low-resolution live-streaming data, or does not process the second live-streaming data.

About S406, the first terminal receives the second live-streaming data, and plays the second live-streaming data in a live-streaming interface.

About S407, the first live-streaming room information includes one or more of a title of the first live-streaming room, an anchor nickname of the first live-streaming room, and a Logo of the first live-streaming room. The second live-streaming room information includes one or more of a title of the second live-streaming room, an anchor nickname of the second live-streaming room, and a Logo of the second live-streaming room.

In some embodiments, the server stores a corresponding relationship between a live-streaming room identifier and live-streaming room information. Correspondingly, acquiring the first live-streaming room information of the first live-streaming room by the server includes: determining, by the server, the first live-streaming room information corresponding to the first live-streaming room identifier from the corresponding relationship between the live-streaming room identifier and the live-streaming room information based on the first live-streaming room identifier.

About S408, the first terminal virtualizes the second live-streaming room as the first live-streaming room, by modifying the second live-streaming room information of the second live-streaming room to be the first live-streaming room information. In this way, the user thinks he/she has entered the first live-streaming room.

It should be noted that the S404 to S405 and the S406 to S407 have no chronological order. In some embodiments, the S404 to S405 are performed first, followed by the S406 to S407. In this way, the first terminal forwards the second live-streaming data, and then modifies the live-streaming room information, which can ensure that the user can watch the second live-streaming data after entering the second live-streaming room, thereby improving the live-streaming responsiveness. In some embodiments, the S406 to S407 are performed first, followed by the S404 to S405. In this way, the live-streaming room information is modified first, and then the first terminal forwards the second live-streaming data, which can modify the live-streaming room information as soon as possible to prevent the user from discovering that he/she has entered the second live-streaming room, thereby increasing the user viscosity. In some embodiments, the S404 to S405 and the S406 to S407 are performed at the same time.

It should be further noted that, in the S406 to S407, the second live-streaming room is virtualized as the first live-streaming room by modifying the live-streaming room information. In the embodiments of the present disclosure, the server can also virtualize the second live-streaming room as the first live-streaming room by hiding the live-streaming room information. Correspondingly, the S406 to S407 are replaced as:

the server sends a hiding request to the first terminal, the hiding request being configured to request the first terminal to hide the second live-streaming room information of the second live-streaming room. The first terminal receives the hiding request and hides the second live-streaming room information.

In the embodiments of the present disclosure, the second live-streaming room is virtualized as the first live-streaming room by hiding the live-streaming room information, which makes the operation simpler.

About S409, the interaction message includes one or more of comment information, emoticons, and virtual gift certificates. The first terminal plays the second live-streaming data in a live-streaming interface, such that the audience account using the first terminal can watch the second live-streaming data in a live-streaming program. In addition, the audience account can interact with the anchor account in the process of watching the second live-streaming data. The interaction message is input in the live-streaming interface in response to that the audience account wants to interact with the anchor account. The first terminal acquires the input interaction message, and sends the interaction message to the server.

In some embodiments, the interaction message includes comment information.

The audience account inputs the comment information in an input box of the live-streaming interface, and the first terminal receives the input comment information and sends the comment information to the server.

In some embodiments, the interaction message includes emoticons. The audience account selects an emoticon from the emoticons in the live-streaming interface, and the first terminal receives the selected emoticon and sends the emoticon to the server.

In some embodiments, the interaction message includes virtual gift certificates. The audience account selects a virtual gift certificate from a virtual gift certificate library in the live-streaming interface, and the first terminal receives the selected virtual gift certificate and sends the virtual gift certificate to the server.

About S410, broadcasting the interaction message by the server to the second live-streaming room includes: acquiring an audience account joining the second live-streaming room and a live-streaming identifier of second live-streaming in the second live-streaming room based on the second live-streaming room identifier of the second live-streaming room, and sending this interaction message to the first terminal based on the audience account; and sending this interaction message to the second terminal based on the anchor identifier.

In the embodiments of the present disclosure, the audience account using the first terminal interacts with the anchor account of the second live-streaming room through the second live-streaming room. At this time, the audience account using the first terminal thinks he/she has joined the first live-streaming room, such that the audience account thinks he/she is interacting with the anchor of the first live-streaming room. That is, the first terminal virtually interacts with the third terminal in the first live-streaming room by interacting with the second terminal in the second live-streaming room. The second terminal is a terminal used by the anchor account in the second live-streaming room; and the third terminal is a virtual terminal corresponding to a virtual anchor account in the first live-streaming room.

It should be noted that the server can broadcast the interaction message to the first live-streaming room. The first live-streaming room is a virtual live-streaming room. Correspondingly, the step S410 includes: receiving the interaction request of the first terminal by the server, and broadcasting the interaction message to the first live-streaming room and the second live-streaming room.

In some embodiments, the server broadcasts the interaction message to the second live-streaming room, and then to the first live-streaming room. In some embodiments, the server broadcasts the interaction message to the first live-streaming room, and then to the second live-streaming room. In some embodiments, the server broadcasts the interaction message to the second live-streaming room and the first live-streaming room at the same time.

In some embodiments, the server acquires a broadcasting sequence based on configuration information of the server; and broadcasts the interaction message to the second live-streaming room and the first live-streaming room based on this broadcasting sequence.

In embodiments of the present disclosure, the server adds the first terminal directly to the second live-streaming room being in live-streaming in response to receiving the joining request of the first terminal requesting to join the first live-streaming room, and modifies the second live-streaming room information of the second live-streaming room to be the first live-streaming room information. In this way, the second live-streaming room is virtualized as the first live-streaming room, such that the user thinks he/she has joined the first live-streaming room, so as to interact with the anchor account in the second live-streaming room, thereby improving the enthusiasm of user interaction.

Figure 6:
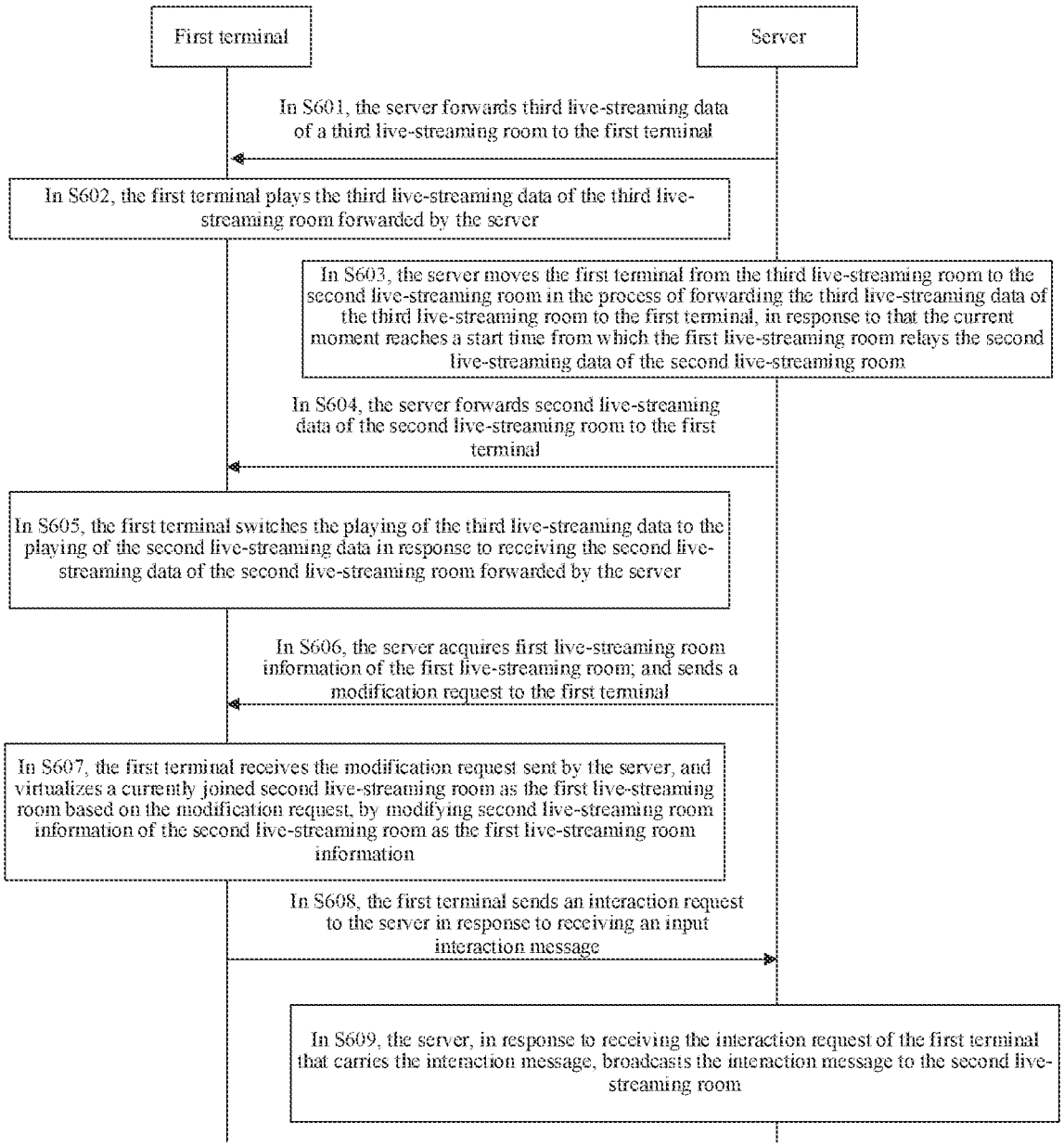
FIG. 6 is an interaction flowchart of a method for interacting in live-streaming according to an embodiment.

FIG. 6 is a flowchart of a method for interacting in live-streaming according to an embodiment. In the embodiments of the present disclosure, the moving of an audience account from one live-streaming room to another live-streaming room is taken as an example for illustration. Referring to FIG. 6, the method for interacting in live-streaming includes the following steps S601 to S609.

In S601, the server forwards third live-streaming data of the third live-streaming room to the first terminal.

In S602, the first terminal plays the third live-streaming data of the third live-streaming room forwarded by the server.

In S603, the server moves the first terminal from the third live-streaming room to the second live-streaming room in the process of forwarding the third live-streaming data of the third live-streaming room to the first terminal, in response to that the current moment reaches a start time from which the first live-streaming room relays the second live-streaming data of the second live-streaming room.

In S604, the server forwards second live-streaming data of the second live-streaming room to the first terminal.

In S605, the first terminal switches the playing of the third live-streaming data to the playing of the second live-streaming data in response to receiving the second live-streaming data of the second live-streaming room forwarded by the server.

In S606, the server acquires first live-streaming room information of the first live-streaming room, and sends a modification request to the first terminal, the modification request carrying the first live-streaming room information and being configured to request the first terminal to modify second live-streaming room information of the second live-streaming room to be the first live-streaming room information.

In S607, the first terminal receives the modification request sent by the server, and virtualizes a currently joined second live-streaming room as the first live-streaming room based on the modification request, by modifying second live-streaming room information of the second live-streaming room to be the first live-streaming room information.

In S608, the first terminal sends an interaction request to the server in response to receiving an input interaction message, the interactive request carrying the interaction message.

In S609, the server, in response to receiving the interaction request of the first terminal that carries the interaction message, broadcasts the interaction message to the second live-streaming room.

About S601, the third live-streaming room is a live-streaming room of which live-streaming data is relayed by the first live-streaming room before the first live-streaming room relays the second live-streaming data. In some embodiments, in the case that the user requests to join the live-streaming room A which originally wants to relay the live-streaming data of the live-streaming room B, the live-streaming room C, and the live-streaming room D, it is known based on the above embodiments that the server will add the first terminal to the live-streaming room B, and watch the live-streaming data of the live-streaming room B in the live-streaming room B.

About S602, this step is similar to the S406 and will not be repeated here.

In some embodiments, the first terminal receives the live-streaming data of the live-streaming room B, and plays the live-streaming data of the live-streaming room B.

About S601, in some embodiments, the server stores the live-streaming room list of the first live-streaming room, the live-streaming room list of the first live-streaming room including a chronological order of the second live-streaming room identifier and the third live-streaming room identifier. Correspondingly, the moving of the first terminal from the third live-streaming room to the second live-streaming room includes: selecting, by the server, a second live-streaming room identifier of the second live-streaming room to be moved to from the live-streaming room list of the first live-streaming room based on a third live-streaming room identifier of the third live-streaming room, wherein the live-streaming room list includes a sequence of each of live-streaming room identifiers of the live-streaming rooms; determining a terminal identifier of the first terminal based on the third live-streaming room identifier; and moving the first terminal to the second live-streaming room from the third live-streaming room based on the second live-streaming room identifier and the terminal identifier of the first terminal.

In some embodiments, the time range of the live-streaming room B is from 9 am to 10 am; the time range of the live-streaming room C is from 10 am to 11 am; and the time range of the live-streaming room D is from 11 am to 12 pm. At 9 am to 10 am, the first terminal plays the live-streaming data of the live-streaming room B. In response to that the current moment reaches 10 am, the live-streaming data of the live-seaming room C should be relayed. At this time, the server moves the first terminal from the live-streaming room B to the live-streaming room C. In response to that the current moment reaches 11 am, the live-streaming data of the live-seaming room D should be relayed. At this time, the server moves the first terminal from the live-streaming room C to the live-streaming room D.

It should be noted that: when the server moves the first terminal from the third live-streaming room to the first live-streaming room, the server, based on the processing capability of the server, sequentially moves a single first terminal, which has joined the third live-streaming room, from the third live-streaming room to the second live-streaming room; or the server moves a plurality of first terminals, which has joined the third live broadcast room, from the third live-streaming room to the second live-streaming room in batches.

In some embodiments, the server moves a preset number of first terminals, which have joined the third live-streaming room, from the third live-streaming room to the second live-streaming room in batches at one time. The preset number is 10, 50, 100, etc. In the embodiments of the present disclosure, the preset number is not specifically limited, and can be set and changed as needed.

It should be further noted: in the case of moving the first terminals from the third live-streaming room to the first live-streaming room, the server, based on user levels of the first terminals, moves the first terminal with a higher user level preferentially, and then moves the first terminal with a lower user level in a delayed manner, which can ensure that high-priority users can watch first live-streaming data of the first live-streaming room as soon as possible.

It should be further noted: in some embodiments, the server moves the first terminal from the third live-streaming room to the second live-streaming room, in response to that the current moment reaches a start time from which the first live-streaming room relays the second live-streaming data of the second live-streaming room, without considering a network delay. In some embodiments, the server moves the first terminal from the third live-streaming room to the second live-streaming room, in response to that the current moment is within a second preset duration prior to this start time, in consideration of a network delay.

In some embodiments, the server moves the first terminal from the third live-streaming room to the second live-streaming room, in response to that the current moment is within the second preset duration prior to this start time, thereby avoiding the problem of untimely moving caused by network delay.

It should be further noted: the server sends a buffer animation to the first terminal in the process of moving the first terminal to the second live-streaming room from the third live-streaming room. The first terminal receives the buffer animation and plays the buffer animation. The buffer animation is configured to indicate that anchors are being switched. In some embodiments, the buffer animation is configured to indicate an animation under loading. The S604 is performed in response to that the server moves the first terminal to the second live-streaming room from the third live-streaming room.

In the embodiments of the present disclosure, the first terminal displays a buffer animation for the audience account in the process of moving the first terminal by the server from the third live-streaming room to the second live-streaming room.

About S604, the second terminal of the second live-streaming room collects second live-streaming data of a live-streaming user and forwards the second live-streaming data to the server. The server receives the second live-streaming data and forwards the second live-streaming data to the first terminal.

In some embodiments, the server moves the first terminal from the live-streaming room B to the live-streaming room C, and then forwards live-streaming data of the live-streaming room C to the first terminal.

It should be further noted: the server sends the third live-streaming data of the third live-streaming room and the second live-streaming data of the second live-streaming room to the first terminal within a first preset duration prior to moving the first terminal to the second live-streaming room from the third live-streaming room; and moves the first terminal from the third live-streaming room to the second live-streaming room in response to that a quality parameter of the second live-streaming data of the second live-streaming room exceeds a preset threshold.

In some embodiments, the time range of the live-streaming room B is from 9 am to 10 am; the time range of the live-streaming room C is from 10 am to 11 am; and the time range of the live-streaming room D is from 11 am to 12 pm. At 9:00 am-10:00 am: the server sends the live-streaming data of the live-streaming room B and the live-streaming data of the live-streaming room C to the first terminal within a first preset duration from 9:59 am to 10:00 am. Therefore, the first terminal can pull the live-streaming data of the live-streaming room B and the live-streaming data of the live-streaming room C at the same time, and move the first terminal from the live-streaming room B to the live-streaming room C after waiting for the first terminal to completely pull the live-streaming data of the live-streaming room C.

It should be further noted: the server can first determine whether the live-streaming user in the second live-streaming room has started live-streaming prior to moving the first terminal to the second live-streaming room from the third live-streaming room. The server moves the first terminal from the third live-streaming room to the second live-streaming room in response that the live-streaming user in the second live-streaming room has started the live-streaming; and does not move the first terminal from the third live-streaming room to the second live-streaming room in response that the live-streaming user in the second live-streaming room has not started the live-streaming, and the server moves the first terminal from the third live-streaming room to the second live-streaming room till the live-streaming user in the second live-streaming room has started the live-streaming In addition, if the live-streaming user in the second live-streaming room has not yet started the live-streaming, the server informs the live-streaming user in the third live-streaming room to continue the live-streaming, thereby avoiding a live-streaming gap caused by the switching of live-streaming rooms.

In some embodiments, the server determines that the live-streaming user in the second live-streaming room has not yet started the live-streaming in response that the server has not received the second live-streaming data of the second live-streaming room; and determines that the live-streaming user in the second live-streaming room has started the live-streaming in response that the server has received the second live-streaming data of the second live-streaming room.

In some embodiments, the server further determines whether the live-streaming user in the second live-streaming room has started the live-streaming based on the second live-streaming data in response that the server has received the second live-streaming data of the second live-streaming room; and moves the first terminal from the third live-streaming room to the second live-streaming room in response that the second live-streaming data being configured to indicate that the live-streaming user in the second live-streaming room has started the live-streaming.

In the embodiments of the present disclosure, after determining that the live-streaming user in the second live-streaming room has started the live-streaming, the server will move the first terminal from the third live-streaming room to the second live-streaming room, which can ensure that the audience account is moved in and has the authority to watch the live-streaming data.

About S605, the second live-streaming data is returned by the server in response to determining that the current moment reaches the time at which the first live-streaming room relays the live-streaming data of the second live-streaming room. The third live-streaming room is a live-streaming room of which live-streaming data is relayed by the first live-streaming room before the first live-streaming room relays the second live-streaming data.

In some embodiments, in S604, the server sends the second live-streaming data to the first terminal, and also sends the third live-streaming data to the first terminal. In this step, the first terminal plays the second live-streaming data in response to that the server only sending the second live-streaming data to the first terminal; and the first terminal continuously plays the third live-streaming data in response to that the server sends the second live-streaming data and the third live-streaming data to the first terminal; and switches the playing of the third live-streaming data to the playing of the second live-streaming data in response to that the quality parameter of the second live-streaming data exceeds the preset threshold.

In the embodiments of the present disclosure, it is indicated that the first terminal has completely pulled the second live-streaming data of the second live-streaming room in response to that the quality parameter of the second live-streaming data exceeds the preset threshold. At this time, the live-streaming data is switched, so as to reduce the jamming of the live-streaming data in the live-streaming room, thereby improving the fluency.

In some embodiments, the first terminal switches the live-streaming data of the live-streaming room B into the live-streaming data of the live-streaming room C.

About S606, this step is similar to the S407 and will not be repeated here.

In some embodiments, the server sends a modification request to the first terminal, the modification request carrying the live-streaming room information of the live-streaming room A and being configured to request the first terminal to modify the live-streaming room information of the live-streaming room C to be the live-streaming room information of the live-streaming room A.

About S606, this step is similar to the S408 and will not be repeated here.

In some embodiments, the first terminal receives this modification request, and modifies the live-streaming room information of the live-streaming room C to be the live-streaming room information of the live-streaming room A, such that the live-streaming room C is virtualized as the live-streaming room A. In this way, the user thinks he/she has joined the live-streaming room A.

It should be noted that: the server does not need to repeatedly send the modification request to the first terminal, in response that the first terminal has not switched the live-streaming rooms for the first time, that is, the first terminal has already acquired the first live-streaming room information. In some embodiments, the first terminal automatically modifies the second live-streaming room information of the second live-streaming room to be the first live-streaming room information in response to detecting the moving of the first terminal from the third live-streaming room to the second live-streaming room.

In some embodiments, in the case that the audience account requests to join the live-streaming room A, and the live-streaming room A relays the live-streaming data of the live-streaming room B, the live-streaming room C, and the live-streaming room D, the server adds the first terminal to the live-streaming room B and sends the live-streaming room information of the live-streaming room A to the first terminal, and the first terminal modifies the live-streaming room information of the live-streaming room B to be the live-streaming room information of the live-streaming room A. The server moves the first terminal from the live-streaming room B directly to the live-streaming room C in response to that the current moment reaches a target time range of the live-streaming room C. At this time, the server does not need to repeatedly send the live-streaming room information of the live-streaming room A to the first terminal, and directly modifies the live-streaming room information of the live-streaming room C to be the live-streaming room information of the live-streaming room A after the first terminal joins the live-streaming room C. Similarly, the server moves the first terminal from the live-streaming room C directly to the live-streaming room D in response to that the current moment reaches a target time range of the live-streaming room D. At this time, the server does not need to repeatedly send the live-streaming room information of the live-streaming room A to the first terminal, and directly modifies the live-streaming room information of the live-streaming room D to be the live-streaming room information of the live-streaming room A after the first terminal joins the live-streaming room D.

About S608, this step is similar to S409 and will not be repeated here.

About S609, this step is similar to S410 and will not be repeated here.

In embodiments of the present disclosure, moving the first terminal to the second live-streaming room from the third live-streaming room in the process of adding the first terminal to the third live-streaming room when the current moment reaches a target time range for relaying the second live-streaming room, and the second live-streaming room information of the second live-streaming room is modified to be the first live-streaming room information. In this way, the second live-streaming room is virtualized as the first live-streaming room, such that the user thinks he/she has joined the first live-streaming room, so as to interact with the anchor account in the second live-streaming room, thereby improving the enthusiasm of user interaction.

All the above-mentioned optional technical solutions may be combined in any way to form an optional embodiment of the present disclosure, which is not repeated here.

Figure 7:
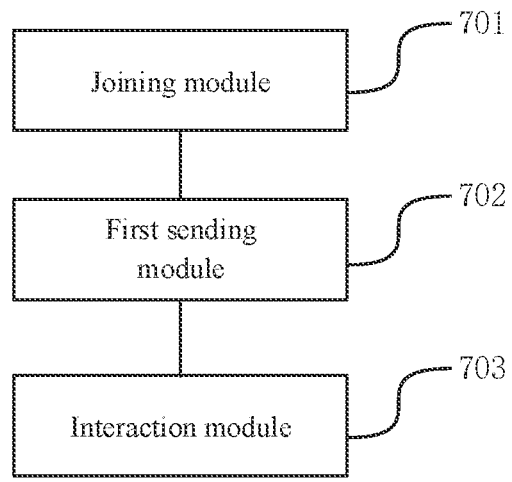
FIG. 7 is a block diagram of a live-streaming interaction apparatus according to an embodiment.

FIG. 7 is a block diagram of a live-streaming interaction apparatus according to an embodiment. Referring to FIG. 7, the apparatus includes:

an adding module 701, configured to add a first terminal requesting to join a first live-streaming room to a second live-streaming room in response to that a current moment is within a target time range, the first live-streaming room being a live-streaming room which relays live-streaming data from a plurality of live-streaming rooms, the target time range being a time range for the first live-streaming room to relay second live-streaming data of the second live-streaming room which is one of the live-streaming rooms, and the first terminal being a terminal used by an audience account;

a first sending module 702, configured to acquire first live-streaming room information of the first live-streaming room, and send a modification request to the first terminal, the modification request carrying the first live-streaming room information and being configured to request the first terminal to modify second live-streaming room information of the second live-streaming room to be the first live-streaming room information; and an interaction module 703, configured to broadcast an interaction message to the second live-streaming room in response to receiving an interaction request of the first terminal, wherein the interaction request carries the interaction message.

In some embodiments, the adding module 701 is further configured to perform a joining request sent by the first terminal, the joining request carrying a first live-streaming room identifier of the first live-streaming room; determine, based on the first live-streaming room identifier, time ranges of a plurality of live-streaming rooms for the first live-streaming room to relay the live-streaming data; and determine the current moment being within a target time range based on the time range of each live-streaming room, and join the first terminal to the second live-streaming room.

In some embodiments, the adding module 701 is further configured to move the first terminal from a third live-streaming room to the second live-streaming room, in response to that the current moment reaches a start time from which the first live-streaming room relays the second live-streaming data of the second live-streaming room, wherein the third live-streaming room is a live-streaming room of which live-streaming data is relayed by the first live-streaming room before the first live-streaming room relays the second live-streaming data.

In some embodiments, the adding module 701 is further configured to select a second live-streaming room identifier of the second live-streaming room to be moved to from a live-streaming room list of the first live-streaming room based on a third live-streaming room identifier of the third live-streaming room, the live-streaming room list including a sequence of each of live-streaming room identifiers of the live-streaming rooms; determine a terminal identifier of the first terminal based on the third live-streaming room identifier; and move the first terminal from the third live-streaming room to the second live-streaming room based on the second live-streaming room identifier.

In some embodiments, the first sending module 702 is further configured to send a buffer animation to the first terminal in the process of moving the first terminal to the second live-streaming room from the third live-streaming room.

In some embodiments, the adding module 701 is further configured to send third live-streaming data of the third live-streaming room and the second live-streaming data of the second live-streaming room to the first terminal within a first preset duration prior to moving the first terminal to the second live-streaming room from the third live-streaming room; and move the first terminal from the third live-streaming room to the second live-streaming room in response to that a quality parameter of the second live-streaming data of the second live-streaming room received by the first terminal exceeds a preset threshold.

In some embodiments, the adding module 701 is further configured to receive the second live-streaming data of the second live-streaming room; and move the first terminal from the third live-streaming room to the second live-streaming room in response to that the second live-streaming data indicates that an anchor account of the second live-streaming room has started live-streaming.

In some embodiments, the adding module 701 is further configured to acquire an audience identifier and a second live-streaming room identifier of the second live-streaming room; determine the second live-streaming room based on the second live-streaming room identifier; and add the first terminal to the second live-streaming room based on the audience account.

In the embodiments of the present disclosure, since the second live-streaming room information of the second live-steaming room is modified to be the first live-streaming room information, the second live-streaming room is virtualized as the first live-streaming room, such that the audience account thinks he/she has entered the first live-streaming room. In addition, since there is an anchor account in the second live-streaming room, the user can directly interact with the anchor account in the second live-streaming room that uses the second terminal, which increases the motivation of the user for interaction.

Figure 8:
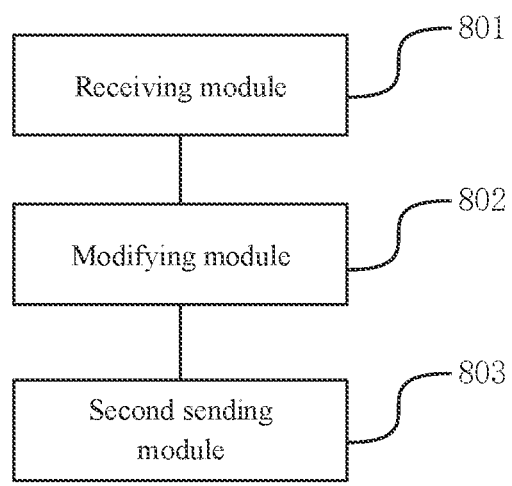
FIG. 8 is a block diagram of a live-streaming interaction apparatus according to an embodiment.

FIG. 8 is a block diagram of a live-streaming interaction apparatus according to an embodiment. Referring to FIG. 8, the live-streaming interaction apparatus includes:

a receiving module 801, configured to receive a modification request sent by a server, the modification request carrying first live-streaming room information of a first live-streaming room, and the first live-streaming room being a live-streaming room configured to relay live-streaming data from a plurality of live-streaming rooms;

a modifying module 802, configured to virtualize a currently joined second live-streaming room as the first live-streaming room based on the modification request, by modifying second live-streaming room information of the second live-streaming room to be the first live-streaming room information; and a second sending module 803, configured to send an interaction request to a server in response to receiving an input interaction message, the interaction request carrying the interaction message and being configured to request the server to broadcast the interaction message to the second live-streaming room.

Figure 9:
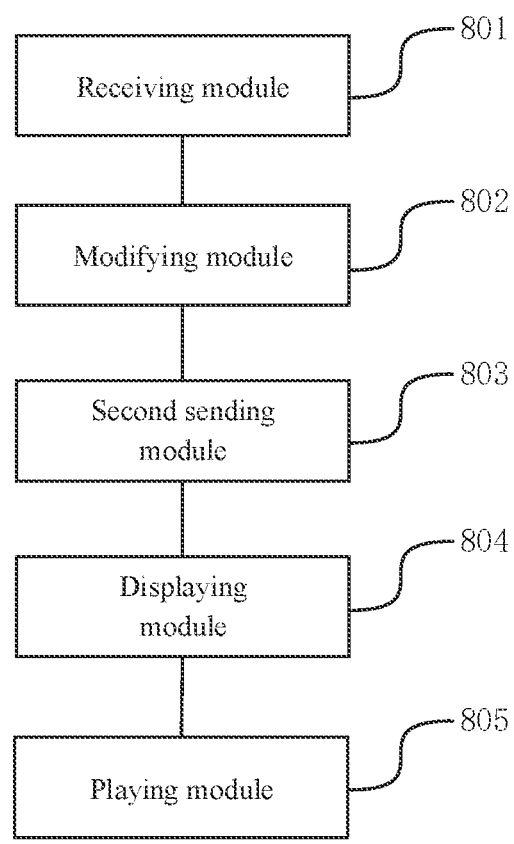
FIG. 9 is a block diagram of a live-streaming interaction apparatus according to an embodiment.

In some embodiments, referring to FIG. 9, the live-streaming interaction apparatus further includes:

a displaying module 804, configured to display a main live-streaming interface, the main live-streaming interface including a first live-streaming room identifier of the first live-streaming room; and a second sending module 803, further configured to send a joining request to the server in response to that the first live-streaming room identifier is triggered, the joining request carrying the first live-streaming room identifier, and the server being configured to determine, based on the first live-streaming room identifier, that the first live-streaming room relays second live-streaming data of the second live-streaming room at the current moment, add the current first terminal to the second live-streaming room, and send the modification request to the first terminal.

In some embodiments, continuously referring to FIG. 9, the live-streaming interaction apparatus further includes:

a playing module 805, configured to perform third-live-streaming data of the third live-streaming room forwarded by the server, and switch the playing of the third live-streaming data to the playing of the second live-streaming data in response to receiving the second live-streaming data of the second live-streaming room forwarded by the server, the second live-streaming data being returned by the server in response to determining that the current moment reaches the time at which the first live-streaming room relays the live-streaming data of the second live-streaming room, and the third live-streaming room is a live-streaming room of which live-streaming data is relayed by the first live-streaming room before the first live-streaming room relays the second live-streaming data.

In some embodiments, the playing module 805 is further configured to receive a buffer animation sent by the server, and play the buffer animation.

In some embodiments, the playing module 805 is further configured to receive the second live-streaming data and the third live-streaming data forwarded by the server; continuously play the third live-streaming data; and switch the playing of the third live-streaming data to the playing of the second live-streaming data in response to that a quality parameter of the second live-streaming data exceeds a preset threshold.

In the embodiments of the present disclosure, since the second live-streaming room information of the second live-steaming room is modified to be the first live-streaming room information, the second live-streaming room is virtualized as the first live-streaming room, such that the audience account thinks he/she has entered the first live-streaming room. In addition, since there is an anchor account in the second live-streaming room, the user can directly interact with the anchor account in the second live-streaming room that uses the second terminal, which increases the motivation of the user for interaction.

With respect to the apparatus in the foregoing embodiment, the specific manner in which each module performs the operation has been described in detail in the embodiment of the method for interacting in live-streaming, and a detailed description will not be given here.

It should be noted: when the live-streaming interaction apparatus provided by the embodiment performs a live-streaming interaction, only the partitioning of the above functional modules is used as an example. In actual applications, the foregoing functions can be allocated to be completed by different functional modules as required. That is, an internal structure of a server is partitioned into different functional modules to complete all or part of the functions described above. In addition, the live-streaming interaction apparatus provided by the foregoing embodiments and the method for interacting in live-streaming embodiment belong to the same concept, and the specific implementation process is detailed in the method embodiments, which will not be repeated here.

Figure 10:
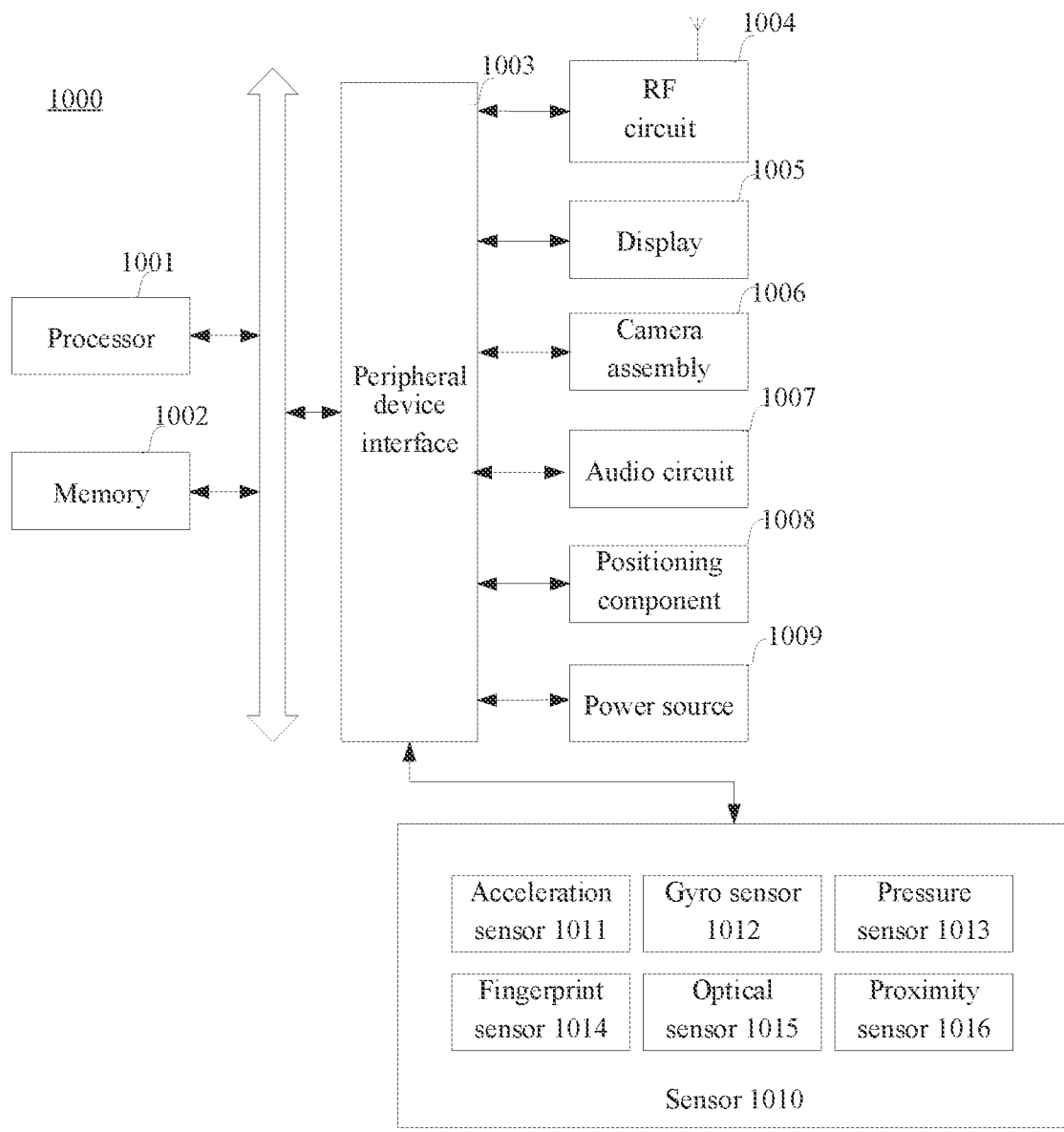
FIG. 10 is a block diagram of a terminal according to an embodiment.

FIG. 10 is a structural block diagram of a terminal 1000 provided by an embodiment of the present disclosure. In some embodiments, the terminal 1000 may be a smart phone, a tablet computer, a moving picture experts group audio layer III (MP3) player, a moving picture experts group audio layer IV (MP4) player, a laptop or desk computer. The terminal 1000 may also be called a UE (User Equipment), a portable terminal, a laptop terminal, a desk terminal, etc.

Generally, the terminal 1000 includes a processor 1001 and a memory 1002.

In some embodiments, the processor 1001 includes one or more processing cores, such as a 4-core processor and an 8-core processor. The processor 1001 may be implemented by at least one hardware of a digital signal processing (DSP), a field-programmable gate array (FPGA), and a programmable logic array (PLA). In some embodiments, the processor 1001 may also include a main processor and a coprocessor. The main processor is a processor configured to process the data in an awake state, and is also called a central processing unit (CPU). The coprocessor is a low-power-consumption processor configured to process the data in a standby state. In some embodiments, the processor 1001 may be integrated with a graphics processing unit (GPU), which is configured to render and draw the content that needs to be displayed by a display screen. In some embodiments, the processor 1001 may also include an artificial intelligence (AI) processor configured to process computational operations related to machine learning.

In some embodiments, the memory 1002 includes one or more computer-readable storage mediums, which can be non-transitory. The memory 1002 may also include a high-speed random access memory, as well as a non-volatile memory, such as one or more disk storage devices and flash storage devices. In some embodiments, a non-transitory computer-readable storage medium in the memory 1002 is configured to store at least one instruction, which is executed by the processor 1001 to implement the method for interacting in live-streaming provided by the method embodiment of the present disclosure.

In some embodiments, the terminal 1000 also includes a peripheral device interface 1003 and at least one peripheral device. The processor 1001, the memory 1002, and the peripheral device interface 1003 may be connected by a bus or a signal line. Each peripheral device may be connected to the peripheral device interface 1003 by a bus, a signal line or a circuit board. In some embodiments, the peripheral device includes at least one of a radio frequency circuit 1004, a display screen 1005, a camera 1006, an audio circuit 1007, a positioning component 1008 and a power source 1009.

The peripheral device interface 1003 may be configured to connect at least one peripheral device associated with an input/output (I/O) to the processor 1001 and the memory 1002. In some embodiments, the processor 1001, the memory 1002 and the peripheral device interface 1003 are integrated on the same chip or circuit board. In some other embodiments, any one or two of the processor 1001, the memory 1002 and the peripheral device interface 1003 may be implemented on a separate chip or circuit board, which is not limited in the present embodiment.

The radio frequency (RF) circuit 1004 is configured to receive and transmit a RF signal, which is also referred to as an electromagnetic signal. The radio frequency circuit 1004 communicates with a communication network and other communication devices via the electromagnetic signal. The radio frequency circuit 1004 converts the electrical signal into the electromagnetic signal for transmission, or converts the received electromagnetic signal into the electrical signal. In some embodiments, the RF circuit 1004 includes an antenna system, an RF transceiver, one or more amplifiers, a tuner, an oscillator, a digital signal processor, a codec chipset, a subscriber identity module card, and the like. The RF circuit 1004 can communicate with other terminals via at least one wireless communication protocol. The wireless communication protocol includes, but not limited to, a metropolitan area network, various generations of mobile communication networks (2G, 3G, 4G, and 5G), a wireless local area network, and a WiFi network. In some embodiments, the RF circuit 1004 may also include near field communication (NFC) related circuits, which is not limited in the present disclosure.

The display screen 1005 is configured to display a user interface (UI). In some embodiments, the UI includes graphics, text, icons, videos, and any combination thereof. When the display screen 1005 is a touch display screen, the display screen 1005 also has the capacity to acquire touch signals on or over the surface of the display screen 1005. The touch signal may be input into the processor 1001 as a control signal for processing. At this time, the display screen 1005 may also be configured to provide virtual buttons and/or virtual keyboards, which are also referred to as soft buttons and/or soft keyboards. In some embodiments, one display screen 1005 may be disposed on a front panel of the terminal 1000. In some other embodiments, at least two display screens 1005 may be disposed respectively on different surfaces of the terminal 1000 or in a folded design. In further embodiments, the display screen 1005 may be a flexible display screen disposed on the curved or folded surface of the terminal 1000. Even the display screen 1005 may have an irregular shape other than a rectangle. That is, the display screen 1005 may be an irregular-shaped screen. The display screen 1005 may be prepared from a material such as a liquid crystal display (LCD), an organic light-emitting diode (OLED), etc.

The camera component 1006 is configured to capture images or videos. In some embodiments, the camera component 1006 includes a front camera and a rear camera. Usually, the front camera is placed on a front panel of a terminal, and the rear camera is placed on the back of the terminal. In some embodiments, at least two rear cameras are disposed, and are at least one of a main camera, a depth-of-field camera, a wide-angle camera, and a telephoto camera respectively, so as to realize a background blurring function achieved by fusion of the main camera and the depth-of-field camera, panoramic shooting and virtual reality (VR) shooting functions achieved by fusion of the main camera and the wide-angle camera or other fusion shooting functions. In some embodiments, the camera component 1006 may also include a flashlight. The flashlight may be a mono-color temperature flashlight or a two-color temperature flashlight. The two-color temperature flash is a combination of a warm flashlight and a cold flashlight and can be used for light compensation at different color temperatures.

In some embodiments, the audio circuit 1007 includes a microphone and a speaker. The microphone is configured to collect sound waves of users and environments, and convert the sound waves into electrical signals which are input into the processor 1001 for processing, or input into the RF circuit 1004 for voice communication. For the purpose of stereo acquisition or noise reduction, there may be a plurality of microphones respectively disposed at different locations of the terminal 1000. In some embodiments, the microphone may also be an array microphone or an omni-directional acquisition microphone. The speaker is then configured to convert the electrical signals from the processor 1001 or the RF circuit 1004 into the sound waves. The speaker may be a conventional film speaker or a piezoelectric ceramic speaker. When the speaker is the piezoelectric ceramic speaker, the electrical signal can be converted into not only human-audible sound waves but also the sound waves which are inaudible to humans for the purpose of ranging and the like. In some embodiments, the audio circuit 1007 may also include a headphone jack.

The positioning component 1008 is configured to locate the current geographic location of the terminal 1000 to implement navigation or location-based service (LBS). The positioning component 1008 may be a positioning component based on the American global positioning system (GPS), the Chinese Beidou system, the Gronass system in Russia or the Russian Galileo system.

The power source 1009 is configured to power up various components in the terminal 1000. The power source 1009 may be alternating current, direct current, a disposable battery, or a rechargeable battery. When the power source 1009 includes the rechargeable battery, the rechargeable battery may a wired rechargeable battery or a wireless rechargeable battery. The rechargeable battery may also support the fast charging technology.

In some embodiments, the terminal 1000 also includes one or more sensors 1010. The one or more sensors 1010 include, but not limited to, an acceleration sensor 1011, a gyro sensor 1012, a pressure sensor 1013, a fingerprint sensor 1014, an optical sensor 1015 and a proximity sensor 1016.

The acceleration sensor 1011 may detect magnitudes of accelerations on three coordinate axes of a coordinate system established by the terminal 1000. In some embodiments, the acceleration sensor 1011 may be configured to detect components of a gravitational acceleration on the three coordinate axes. The processor 1001 may control the touch display screen 1005 to display a user interface in a landscape view or a portrait view according to a gravity acceleration signal collected by the acceleration sensor 1011. The acceleration sensor 1011 may also be configured to collect motion data of a game or a user.

The gyro sensor 1012 can detect a body direction and a rotation angle of the terminal 1000, and can cooperate with the acceleration sensor 1011 to collect a 3D motion of the user on the terminal 1000. Based on the data collected by the gyro sensor 1012, the processor 1001 can serve the following functions: motion sensing (such as changing the UI according to a user's tilt operation), image stabilization during shooting, game control and inertial navigation.

In some embodiments, the pressure sensor 1013 may be disposed on a side frame of the terminal 1000 and/or a lower layer of the touch display screen 1005. When the pressure sensor 1013 is disposed on the side frame of the terminal 1000, a user's holding signal to the terminal 1000 can be detected. The processor 1001 can perform left-right hand recognition or quick operation according to the holding signal collected by the pressure sensor 1013. When the pressure sensor 1013 is disposed on the lower layer of the touch display screen 1005, the processor 1001 controls an operable control on the UI according to a user's pressure operation on the touch display screen 1005. The operable control includes at least one of a button control, a scroll bar control, an icon control and a menu control.

The fingerprint sensor 1014 is configured to collect a user's fingerprint. The processor 1001 identifies the user's identity based on the fingerprint collected by the fingerprint sensor 1014, or the fingerprint sensor 1014 identifies the user's identity based on the collected fingerprint. When the user's identity is identified as trusted, the processor 1001 authorizes the user to perform related sensitive operations, such as unlocking the screen, viewing encrypted information, downloading software, paying, and changing settings. The fingerprint sensor 1014 may be provided on the front, back, or side of the terminal 1000. When the terminal 1000 is provided with a physical button or a manufacturer's Logo, the fingerprint sensor 1014 may be integrated with the physical button or the manufacturer's Logo.

The optical sensor 1015 is configured to collect ambient light intensity. In one embodiment, the processor 1001 may control the display brightness of the display screen 1005 according to the ambient light intensity collected by the optical sensor 1015. In some embodiments, when the ambient light intensity is high, the display brightness of the display screen 1005 is increased; and when the ambient light intensity is low, the display brightness of the display screen 1005 is decreased. In another embodiment, the processor 1001 may also dynamically adjust shooting parameters of the camera component 1006 according to the ambient light intensity collected by the optical sensor 1015.

The proximity sensor 1016, also referred to as a distance sensor, is usually disposed on the front panel of the terminal 1000. The proximity sensor 1016 is configured to capture a distance between the user and a front surface of the terminal 1000. In one embodiment, when the proximity sensor 1016 detects that the distance between the user and the front surface of the terminal 1000 becomes gradually smaller, the processor 1001 controls the touch display screen 1005 to switch from a screen-on state to a screen-off state. When it is detected that the distance between the user and the front surface of the terminal 1000 gradually increases, the processor 1001 controls the display screen 1005 to switch from the screen-off state to the screen-on state.

It will be understood by those skilled in the art that the structure shown in FIG. 10 does not constitute a limitation to the terminal 1000, and can include more or less components than those illustrated, or combine some components or adopt different component arrangements.

In some embodiments, a terminal is further provided. The terminal includes:
a processor; and
a memory configured to store an instruction executable by the processor, wherein
the processor is configured to execute the instruction to implement any of the above method for interacting in live-streaming.

Figure 11:
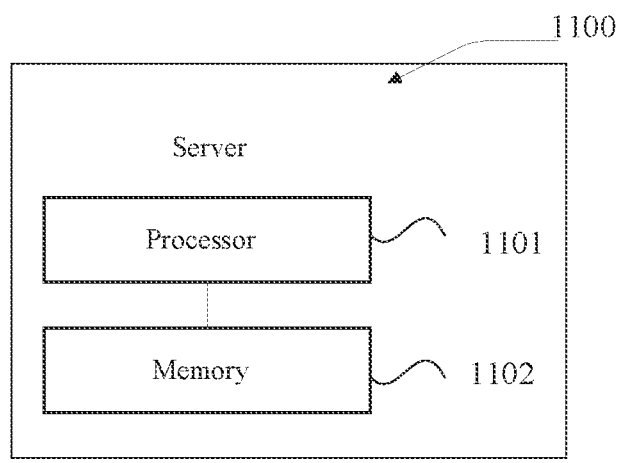
FIG. 11 is a block diagram of a server according to an embodiment.

FIG. 11 is a block diagram of a server according to an embodiment of the present disclosure. The server 1100 can vary greatly depending on different configurations or performances, and may include one or more central processing units (CPUs) 1101 and one or more memories 1102. The memory 1102 is configured to store an executable instruction. The processor 1101 is configured to perform the executable instruction to implement any of the above method for interacting in live-streaming.

In some embodiments, a computer-readable storage medium is further provided. An instruction stored in the computer-readable storage medium, when being executed by a processor of the server, enables the server to perform any of the above method for interacting in live-streaming.

The computer-readable storage medium may be a read-only memory (ROM), a random access memory (RAM), a compact disc read-only memory (CD-ROM), a magnetic tape, a floppy disk, an optical data storage apparatus, or the like.

In some embodiments, a computer program product is further provided. An instruction in the computer program product, when being executed by a processor of a server, enables the server to perform any of the above method for interacting in live-streaming.

In some embodiments, a computer program product is further provided. An instruction in the computer program product, when being executed by a processor of a terminal, enables the terminal to perform any of the above method for interacting in live-streaming.

All embodiments of the present disclosure are capable of being performed alone, or in combination with other embodiments, both of which are within the scope of protection as claimed.

What is claimed is:

1. A method for interacting in live-streaming, executed by a server, comprising:
adding a first terminal requesting to join a first live-streaming room to a second live-streaming room in response to that a current moment is within a target time range, the first live-streaming room being a live-streaming room which relays live-streaming data from a plurality of live-streaming rooms, the target time range being a time range for the first live-streaming room to relay second live-streaming data of the second live-streaming room which is one of the live-streaming rooms, and the first terminal being a terminal used by an audience account;

acquiring first live-streaming room information of the first live-streaming room, and sending a modification request to the first terminal, the modification request carrying the first live-streaming room information and being configured to request the first terminal to modify second live-streaming room information of the second live-streaming room to be the first live-streaming room information; and broadcasting an interaction message to the second live-streaming room in response to receiving an interaction request of the first terminal, wherein the interaction request carries the interaction message.

2. The method according to claim 1, wherein adding the first terminal requesting to join the first live-streaming room to the second live-streaming room in response to that the current moment is within the target time range comprises:

receiving a joining request sent by the first terminal, the joining request carrying a first live-streaming room identifier of the first live-streaming room;

determining, based on the first live-streaming room identifier, a time range of each live-streaming room for the first live-streaming room to relay live-streaming data; and adding the first terminal to the second live-streaming room in response to determining that the current moment is within the target time range for the first live-streaming room to relay the second live-streaming data of the second live-streaming room based on the time range of each live-streaming room.

3. The method according to claim 1, wherein adding the first terminal requesting to join the first live-streaming room to the second live-streaming room in response to that the current moment is within the target time range comprises:

moving the first terminal from a third live-streaming room to the second live-streaming room, in response to that the current moment reaches a start time from which the first live-streaming room relays the second live-streaming data of the second live-streaming room;

wherein the third live-streaming room is a live-streaming room of which live-streaming data is relayed by the first live-streaming room before the first live-streaming room relays the second live-streaming data.

4. The method according to claim 3, wherein moving the first terminal to the second live-streaming room from the third live-streaming room comprises:

selecting, from a live-streaming room list of the first live-streaming room and based on a third live-streaming room identifier of the third live-streaming room, a second live-streaming room identifier of the second live-streaming room to be moved to, wherein the live-streaming room list comprises a sequence of each of live-streaming room identifiers of the live-streaming rooms;

determining a terminal identifier of the first terminal based on the third live-streaming room identifier; and moving the first terminal to the second live-streaming room from the third live-streaming room based on the second live-streaming room identifier and the terminal identifier of the first terminal.

5. The method according to claim 3, further comprising:
sending a buffer animation to the first terminal in a process of moving the first terminal to the second live-streaming room from the third live-streaming room.

6. The method according to claim 3, further comprising:
sending third live-streaming data of the third live-streaming room and the second live-streaming data of the second live-streaming room to the first terminal within a first preset duration prior to moving the first terminal to the second live-streaming room from the third live-streaming room; and moving the first terminal to the second live-streaming room from the third live-streaming room in response to that a quality parameter of the second live-streaming data of the second live-streaming room received by the first terminal exceeds a preset threshold.

7. The method according to claim 3, further comprising:
receiving the second live-streaming data of the second live-streaming room; and moving the first terminal to the second live-streaming room from the third live-streaming room in response to that the second live-streaming room has started live-streaming.

8. The method according to claim 1, wherein adding the first terminal requesting to join the first live-streaming room to the second live-streaming room comprises:

acquiring a second live-streaming room identifier of the second live-streaming room;

determining the second live-streaming room based on the second live-streaming room identifier; and adding the first terminal to the second live-streaming room based on the audience account.

9. A method for interacting in live-streaming, executed by a terminal, comprising:

receiving a modification request sent by a server, the modification request carrying first live-streaming room information of a first live-streaming room, and the first live-streaming room being a live-streaming room configured to relay live-streaming data from a plurality of live-streaming rooms;

virtualizing a currently joined second live-streaming room as the first live-streaming room based on the modification request, by modifying second live-streaming room information of the second live-streaming room to be the first live-streaming room information; and sending an interaction request to the server in response to receiving an input interaction message, the interaction request carrying the interaction message and being configured to request the server to broadcast the interaction message to the second live-streaming room.

10. The method according to claim 9, further comprising:
displaying a main live-streaming interface, the main live-streaming interface comprising a first live-streaming room identifier of the first live-streaming room; and sending a joining request to the server in response to that the first live-streaming room identifier is triggered, the joining request carrying the first live-streaming room identifier, and the server being configured to determine, based on the first live-streaming room identifier, that the first live-streaming room relays second live-streaming data of the second live-streaming room at a current moment, add a first terminal sending the joining request to the second live-streaming room, and send the modification request to the first terminal.

11. The method according to claim 9, further comprising:
playing third live-streaming data of a third live-streaming room forwarded by the server; and
switching playing of third live-streaming data to playing of second live-streaming data in response to receiving the second live-streaming data of the second live-streaming room forwarded by the server, the second live-streaming data being returned by the server in response to reaching a start time from which the first live-streaming room relays the second live-streaming data of the second live-streaming room, and the third live-streaming room being a live-streaming room of which live-streaming data is relayed by the first live-streaming room before the first live-streaming room relays the second live-streaming data.

12. The method according to claim 11, further comprising:
receiving a buffer animation sent by the server, and playing the buffer animation.

13. The method according to claim 11, wherein switching the playing of the third live-streaming data to the playing of the second live-streaming data in response to receiving the second live-streaming data of the second live-streaming room forwarded by the server comprises:
receiving the second live-streaming data and the third live-streaming data forwarded by the server;
continuously playing the third live-streaming data; and
switching the playing of the third live-streaming data to the playing of the second live-streaming data in response to that a quality parameter of the second live-streaming data exceeds a preset threshold.

14. A server, comprising:
a processor; and
a memory configured to store an instruction executable by the processor, wherein
the processor is configured to execute the instruction to implement:
adding a first terminal requesting to join a first live-streaming room to a second live-streaming room in response to that a current moment is within a target time range, the first live-streaming room being a live-streaming room which relays live-streaming data from a plurality of live-streaming rooms, the target time range being a time range for the first live-streaming room to relay second live-streaming data of the second live-streaming room which is one of the live-streaming rooms, and the first terminal being a terminal used by an audience account;
acquiring first live-streaming room information of the first live-streaming room, and sending a modification request to the first terminal, the modification request carrying the first live-streaming room information and being configured to request the first terminal to modify second live-streaming room information of the second live-streaming room to be the first live-streaming room information; and
broadcasting an interaction message to the second live-streaming room in response to receiving an interaction request of the first terminal, wherein the interaction request carries the interaction message.

15. The server according to claim 14, wherein the processor is further configured to execute the instruction to implement:
receiving a joining request sent by the first terminal, the joining request carrying a first live-streaming room identifier of the first live-streaming room;
determining, based on the first live-streaming room identifier, a time range of each live-streaming room for the first live-streaming room to relay live-streaming data; and
adding the first terminal to the second live-streaming room in response to determining that the current moment is within the target time range for the first live-streaming room to relay the second live-streaming data of the second live-streaming room based on the time range of each live-streaming room.

16. The server according to claim 14, wherein adding the first terminal requesting to join the first live-streaming room to the second live-streaming room in response to that the current moment is within the target time range comprises:
moving the first terminal from a third live-streaming room to the second live-streaming room, in response to reaching a start time from which the first live-streaming room relays the second live-streaming data of the second live-streaming room; wherein
third live-streaming room is a live-streaming room of which live-streaming data is relayed by the first live-streaming room before the first live-streaming room relays the second live-streaming data.

17. The server according to claim 16, wherein moving the first terminal to the second live-streaming room from the third live-streaming room comprises:
selecting a second live-streaming room identifier of the second live-streaming room to be moved to from a live-streaming room list of the first live-streaming room based on a third live-streaming room identifier of the third live-streaming room, wherein the live-streaming room list comprises a sequence of each of live-streaming room identifiers of the live-streaming rooms;
determining a terminal identifier of the first terminal based on the third live-streaming room identifier; and
moving the first terminal to the second live-streaming room from the third live-streaming room based on the second live-streaming room identifier and the terminal identifier of the first terminal.

18. The server according to claim 16, wherein the processor is further configured to execute the instruction to implement:
sending a buffer animation to the first terminal in a process of moving the first terminal to the second live-streaming room from the third live-streaming room.

19. The server according to claim 16, wherein the processor is further configured to execute the instruction to implement:
sending third live-streaming data of the third live-streaming room and the second live-streaming data of the second live-streaming room to the first terminal within a first preset duration prior to moving the first terminal to the second live-streaming room from the third live-streaming room; and
moving the first terminal to the second live-streaming room from the third live-streaming room in response to that a quality parameter of the second live-streaming data of the second live-streaming room received by the first terminal exceeds a preset threshold.

20. The server according to claim 16, wherein the processor is further configured to execute the instruction to implement:
receiving the second live-streaming data of the second live-streaming room; and
moving the first terminal to the second live-streaming room from the third live-streaming room in response to that the second live-streaming data indicates that an anchor account of the second live-streaming room has started live-streaming.

\* \* \* \* \*